United States Patent
Johnsen

[11] Patent Number: 5,815,906
[45] Date of Patent: Oct. 6, 1998

[54] METHOD OF BLIND RIVETING, BLIND RIVET WITH AN EXPANSION SECTION AND A DEVICE FOR PERFORMING THE METHOD

[76] Inventor: Svein Ove Johnsen, Trosviktoppen 4, N-1614 Fredrikstad, Norway

[21] Appl. No.: 549,688

[22] PCT Filed: May 10, 1994

[86] PCT No.: PCT/NO94/00091

§ 371 Date: Jan. 11, 1996

§ 102(e) Date: Jan. 11, 1996

[87] PCT Pub. No.: WO94/27054

PCT Pub. Date: Nov. 24, 1994

[30] Foreign Application Priority Data

May 10, 1993 [NO] Norway .................................. 931702

[51] Int. Cl.$^6$ .............................. B23P 11/00; F16B 19/10
[52] U.S. Cl. ................... 29/524.1; 29/34 B; 29/243.517; 29/243.53; 411/30; 411/38; 411/69
[58] Field of Search ............................ 29/525.06, 524.1, 29/243.518, 243.53, 34 B, 243.517; 411/30, 31, 34, 38, 43, 69, 70, 387

[56] References Cited

U.S. PATENT DOCUMENTS

| | | | |
|---|---|---|---|
| 4,678,384 | 7/1987 | Sparling et al. | 411/69 X |
| 4,920,833 | 5/1990 | Rosenthal . | |
| 5,051,048 | 9/1991 | Maddox | 411/38 X |
| 5,183,357 | 2/1993 | Palm | 411/29 |
| 5,259,713 | 11/1993 | Renner et al. | 411/34 |

FOREIGN PATENT DOCUMENTS

| | | | |
|---|---|---|---|
| 246384 | 8/1963 | Australia | 411/34 |
| 45-34333 | 11/1970 | Japan | 411/38 |
| 7414653 | 11/1974 | Netherlands | 411/69 |
| 912193 | 12/1992 | Norway . | |
| 1178655 | 1/1970 | United Kingdom . | |

*Primary Examiner*—S. Thomas Hughes
*Attorney, Agent, or Firm*—Merchant, Gould, Smith, Edell, Welter & Schmidt

[57] ABSTRACT

The present invention concerns a self-cutting blind rivet/expansion rivet without draw nails in the core of the rivet, a method for blind riveting/expansion and an apparatus for performing the method, together with a function for expansion by a combination of these within the same process. There is described a blind rivet (101) expansion rivet (300) which comprises a head (101) with an engagement body (102) for co-operation with a complementary screw nose on a mounting tool, a self-drilling tip (103) in the outer end of the rivet and an axial hole (104) which at least over part of its length is provided with a conical section for attachment from the tool for mounting the rivet, and in addition a mountable head (FIG. 3A) for expansion/riveting which is equipped with a clamping sleeve (303). A self-drilling blind rivet system comprises a tool for placing and expanding the rivet in the same process, where the tool's nose head increases the area of application within a number of fastening systems. Riveting/expansion or a combination of these takes place with the same nose head. The tool's operating is the same as that described for a self-drilling blind rivet, but with a clamping sleeve/drawing rod mounted, the area of application for fastening systems will have a wide scope.

18 Claims, 12 Drawing Sheets

METHOD OF BLIND RIVETING, BLIND RIVET WITH AN EXPANSION SECTION AND A DEVICE FOR PERFORMING THE METHOD

FIELD OF THE INVENTION

The present invention concerns a self-cutting blind rivet/expansion rivet, a method for blind riveting/expansion and an apparatus for performing the method, together with a function for expansion by a combination of these within the same process by means of the tool's replaceable nose.

BACKGROUND OF THE INVENTION

Blind riveting is a known method for joining plates, or for securing plates to a framework.

As a rule, known blind riveting systems consist of a sealed or open rivet with draw nails. The rivet is inserted into a pre-drilled hole in the elements which have to be joined together. The drawing tool is placed over the projecting draw nail and the tool is activated. This can either be performed manually with conventional blind rivet tongs (so-called PO rivet tongs), "accordion" tongs or a pneumatically or hydraulically operated drawing tool. The tool usually consists of three grip jaws. When the tool is pulled/activated, the jaws grip around the draw nail and pull it while at the same time the tool's mouthpiece rests against the rivet head. The draw nail's head, which is secured in the bottom of the rivet, will now cause the rivet to expand/form a flange which is pulled against the inside of the rivet connection. When this is achieved, the elements are clamped together until the draw nail breaks. The draw nail is adapted to break when a favorable pressure is attained for the rivet connection and this is achieved here by the fact that the draw nail can be made of different types of metal or alloys such as, e.g., aluminum, monel and stainless steel. The strength of the rivet connection is determined solely by the breaking strength of rivet and nails.

There are also other known systems for combined connections such as, e.g., screw rivets which both connect the elements and form screw fastenings. These rivets are without draw nails and have instead a threaded section in the bottom. Instead of "jaws" the drawing tool has a hardened screw in "the nose". The rivet is screwed on to this and inserted into the hole in the elements which have to be joined together. The tool is activated and drawing continues until a satisfactory force has been achieved. A rivet connection has now been obtained with a screw fastening. In this type of connection, as a rule the actual screw fastening is the primary factor, since this method takes more time than the blind riveting which is described above.

Both of these rivet types, however, are characterized by the fact that a rivet connection can be achieved without a rivet holder at the back, thus providing significant advantages in those cases where the back of the elements is not accessible.

As described above, blind riveting is dependent on an extra nail (draw nail) which can be considered unnecessary material consumption and which can be left in the rivet leading to spots of corrosion. The "threaded rivets" are very time-consuming to use, and both rivet types are dependent on a separate drilling process, even though blind rivets are known in the patent literature with a self-cutting drilling tip.

In Norwegian patent application 91 2193 there is disclosed a blind rivet which comprises a head with an engagement body for co-operation with a complementarily shaped screw nose on a mounting tool, a self-drilling tip at the outer end of the rivet and an axial hole which over at least part of its length is provided with threads, and where the self-drilling tip forms an integral part of the blind rivet. From the same application there is also disclosed a device for mounting blind rivets, where the device comprises a housing with a drawing system. The drawing system includes a piston and a drawing rod which extends along the entire length of the device and in the front end of the drawing rod there is removably attached a draw pin with an outer part, a detachable rivet holder and a screw nose connected to a motor and a magnet.

By means of this known rivet a screw fastening is obtained for the draw pin and the disadvantages associated with rivets having draw nails are eliminated. Blind rivets with a screw fastening, however, are expensive to use, since the formation of the threaded section entails extra costs in connection with the manufacture of the rivet which thereby becomes more expensive to purchase. In addition, blind rivets with a screw fastening are more time-consuming to use than rivets with draw nails and there is also a risk that the threads may be damaged during insertion of the rivet, thus causing a functional failure during the subsequent drawing of the rivet.

SUMMARY OF THE INVENTION

The object of the present invention is therefore to provide a self-cutting blind rivet/expansion rivet, a method for blind riveting/expansion, and a tool for performing the method which eliminate the disadvantages associated with known blind riveting/expansion systems.

The blind rivet/expansion rivet is characterized according to the invention in that it is of the self-drilling type, with a front self-drilling tip, a head and possibly a sleeve with an engagement body and an internal axial hole which over at least part of its length is conical for engagement with the tension nail's screw tap in the tool which has a left-hand thread. The drawing rod/clamping sleeve replaces a screw tap on the tool's nose in the expansion/blind riveting system with the exception of the very smallest dimensions within the blind riveting field. The self-drilling tip can be a hardened integral part of the blind rivet or it can consist of a coating of oxides, carbide, quartz or hard metal. Loose cutting edges of the materials may be inserted. The engagement body is designed for co-operation with a complementarily shaped screw nose on a mounting tool. The engagement body can be designed, for example, with a single transverse groove, conical torx, star-shaped, with an internal (umbraco) or external (pipe) hexagonal shape, outer or inner triangular or rectangular shape or conical wedge engagement as described herein.

The mounting tool for mounting blind/expansion rivets comprises a housing with a drawing system including pistons and drawing rods which extend along the entire length of the device up to a magnet. In the front end of the drawing rod in the tool there is attached a draw pin with a threaded outer part and conical outer part for the expansion system, and a detachable rivet holder and screw nose. The draw pin's left-hand threaded screw tap is arranged to engage with an axially conical hole in the blind rivet and the screw nose is complementarily shaped as an engagement body on the head of the blind rivet for engagement with the head during the blind rivet's self-drilling formation of a hole in a piece of work or elements which have to be joined. The screw tap on the draw pin's outer part has a left-hand thread. The screw nose is arranged to hold the rivet head while the rivet is being tightened by means of the drawing rod. Apart from the case of the smallest blind riveting systems, the left-hand threaded draw pin is replaced by a drawing rod/clamping sleeve. The tool's motor and pistons can be operated electrically, pneumatically or hydraulically or a combination of these. The drawing rod's movement is adjustable, thus enabling the draw force and the draw length to be varied. The tool also comprises means for adjusting the draw force and draw length, in addition to determining where on the length of the rivet the expansion/blind riveting should be performed.

BRIEF DESCRIPTION OF THE DRAWINGS

There now follows a description of an embodiment of the apparatus according to the invention with reference to the accompanying drawings.

Detailed Description of the Preferred Embodiment (s)

Figure 1A:
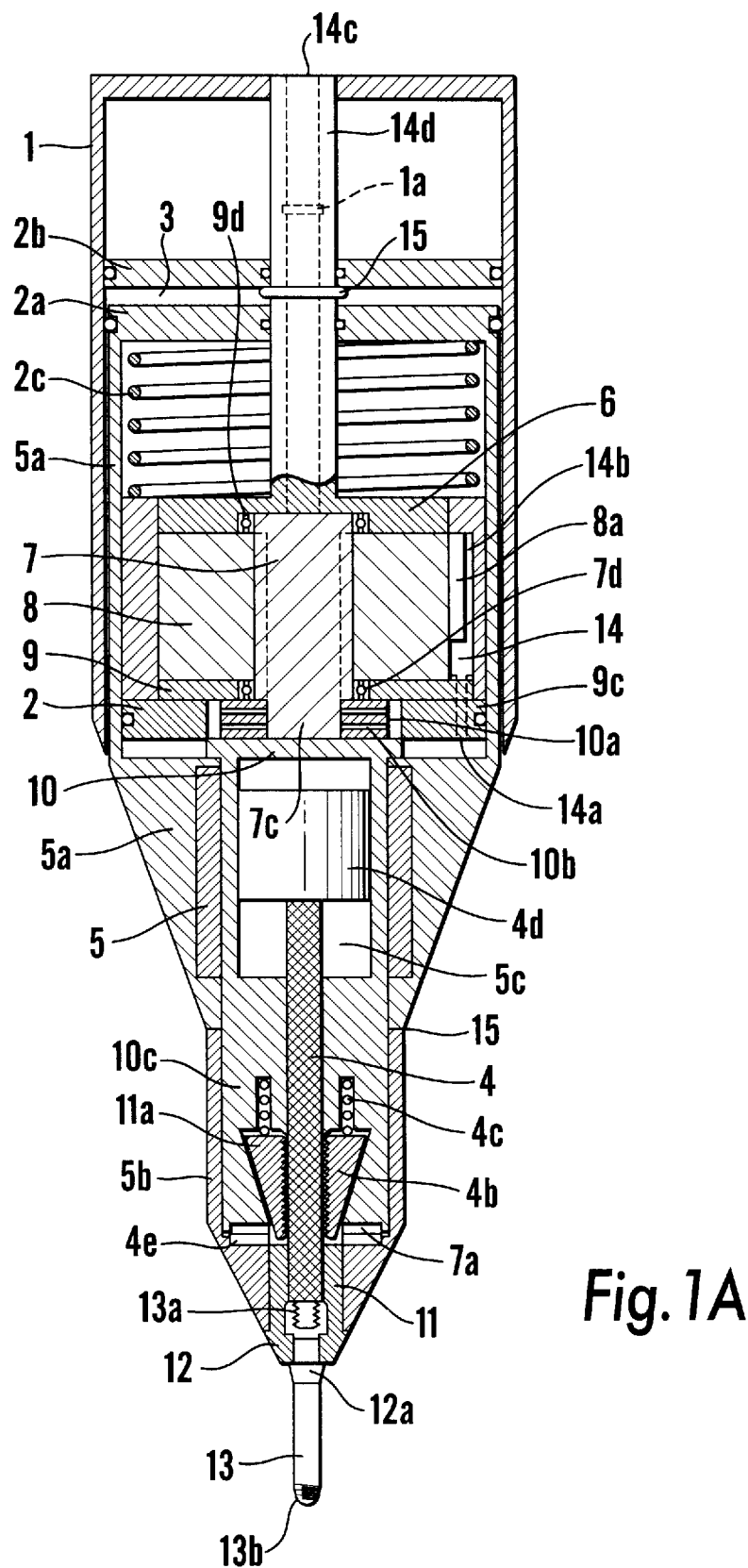
FIG. 1A illustrates a pneumatically operated version of a device for use with the method according to the invention.
Figure 1B:
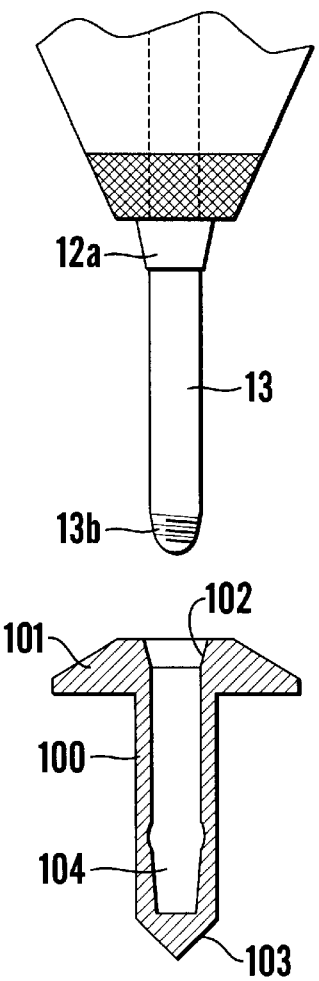
FIG. 1B illustrates a self-drilling blind rivet according to the invention attached to the device in FIG. 1A.

As shown in FIG. 1A, the apparatus comprises a housing 1 with a complete drawing system consisting of a piston 2, 2a and 2b. A retracting spring 2c engages against a rear cover 3 of the piston 2a. The piston rod 14d is internally hollow with a seal 1a and locking ring 15 externally thereof. The piston rod is attached to the rear cover 6, and to the rear end of the housing 1 which activates the pistons 2a and 2b.

Attached to the drawing rod is a magnetically sensitive ring 4d which is located in the chamber 5c. The ring is surrounded by a magnet 5 which is attached to the expansion housing 5a. In the front of the inner part of the nose sleeve 5b there is located a gear rim 4e which normally is engaged with the planetary gearshaft (engine shaft) 10c, in the front edge of which is a coincident gear rim 7a. In the front part of the engine shaft is located a grip jaw device 4b in the form of a pyramid with a honeycomb patterned surface facing the drawing rod. Activation of the device 4b is with an activation spring 4c. To the engine shaft there is attached a complete vane motor 8 with 2–3 vanes 8a, which in the conventional manner extend in radial grooves in the rotor. As illustrated in FIG. 1A the housing is eccentric with expansion/drive chambers in the bottom in the conventional manner, in this case with multiport system inlet 14. In the front edge the engine shaft is mounted in the motor bearing 7d and in the rear edge 9d.

In the front edge of the vane engine shaft 7 is a gear wheel 7c which is engaged with three planetary gears 10a, which are attached to the planetary rim 10 by means of gear pins 10b. The planetary gearshaft 10c is located in the front edge of the planetary rim. The entire planetary rim with gear extends with internal planetary gearing 9c which is attached to the front housing 9.

The front edge of the drawing rod 4 which extends through the tool is in the form of a pyramid with a honeycomb patterned surface in order to make contact with grip jaws 4b, and the rod 4 is threaded in the front edge and attached to a replaceable draw pin 13. In the rear edge the draw pin has a head 13a and in the front edge a left-hand threaded screw tap 13b.

The design permits the entire drawing rod to be pulled in through the tool, with the nose sleeve, rivet holder and screw nose being internally hollow with control for the draw pin.

Figure 4A:
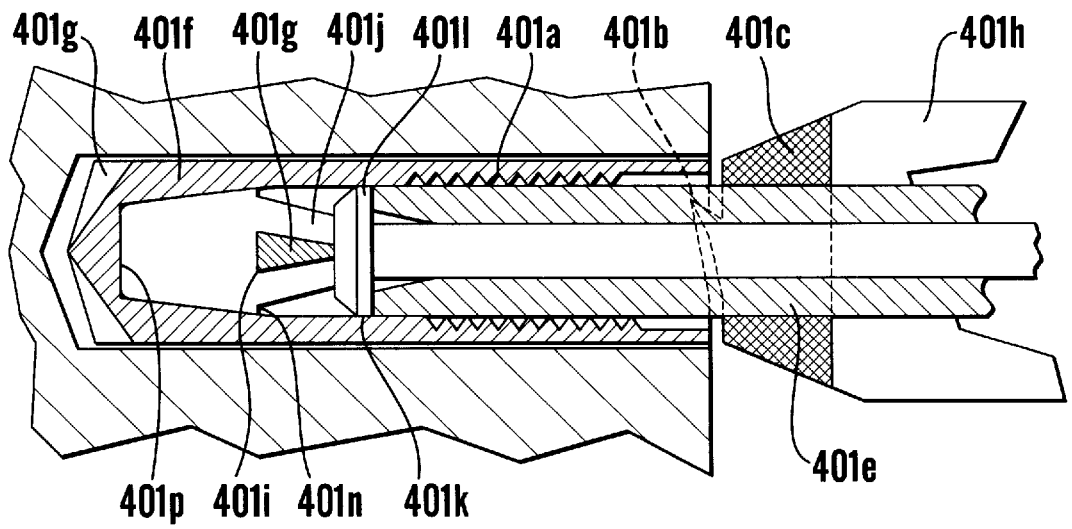
FIGS. 4A and 4B illustrate an alternate embodiment utilizing a rivet without a rivet head.
Figure 4B:
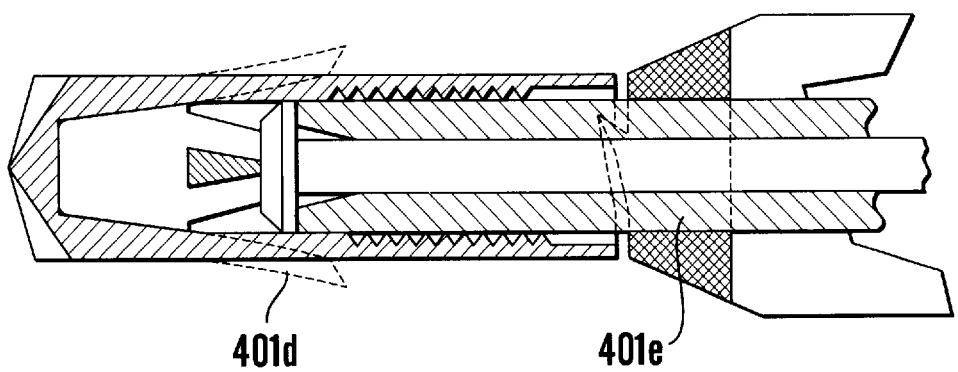

FIGS. 1B,2A,2B,2C,2D illustrate a self-drilling blind rivet 100 with a head 101 which has a conical engagement 102 for the tool which fits with engagement 12a from the tool. In the front end of the rivet there is a disposable drill tip 103. This tip can be manufactured as an integral hardened zone or by means of a coating of oxides/carbide/quartz/hard metal or by means of a loosely inserted cutting edge. In its outer part there is a free hole in the interior of the rivet for the tool's draw pin and in the bottom a conical hole 104 for threading for attaching it to the draw pin. The length and shape of the blind rivet can be varied according to the intended areas of application. Thus the blind rivet is an integral unit intended for drilling and riveting and it will also be able to be used for inserting screws in the rivet connection, as shown in FIGS. 4A, 4B.

FIGS. 1B,2A,2B,2C,2D illustrate various phases of blind riveting according to the invention. The actual method can be divided into four different phases:

a. Attachment of the rivet to the tool.
    b. Drilling.
    C. Drawing.
    d. Release.

The rivet 100 is attached to the drawing tool by threading the rivet 100 into the draw pin 13 and the rivet's right-hand rotation in the drilling process will automatically thread it into the rivet's conical section 104 when it is drilled. This is due to the fact that the front part 13b of the draw pin 13 has a left-hand thread. At this stage the gear rims 4e and 7a are engaged with each other, thereby locking the nose sleeve 5b and its conical engagement body 12a in the rivet's head 102 for the drilling process, while at the same time the drawing rod 4 is released from the grip jaws 4b, and remains at a standstill in the magnetic field, FIG. 2A, until the rivet has threaded itself on the draw pin 13, FIG. 2B. The magnetic field will now be easily overcome and the entire drawing rod will join in the right-hand rotation, or in other words move synchronously with the nose sleeve. (In this process moment sensitivity with release can also be used.) A certain difference in rivet lengths is absorbed by the drawing rod's facility to spring inwards, i.e. springing axially outside the balance field 5 and 4d. This already occurs during the first revolutions in the drilling phase. All of these processes occur during the drilling operation which always has right-hand rotation. The nose sleeve rotates freely from element 15, since at this point the opening is released from the expansion housing 5a in the drilling process. The tool performs the entire process by rotating only in one direction, which makes the tool simple and very reliable.

The threads in the tool and the tool's direction of rotation can, of course, be the opposite of that described above, thus making it possible to use standard threads for further installation in the mounted rivet.

Figure 2A:
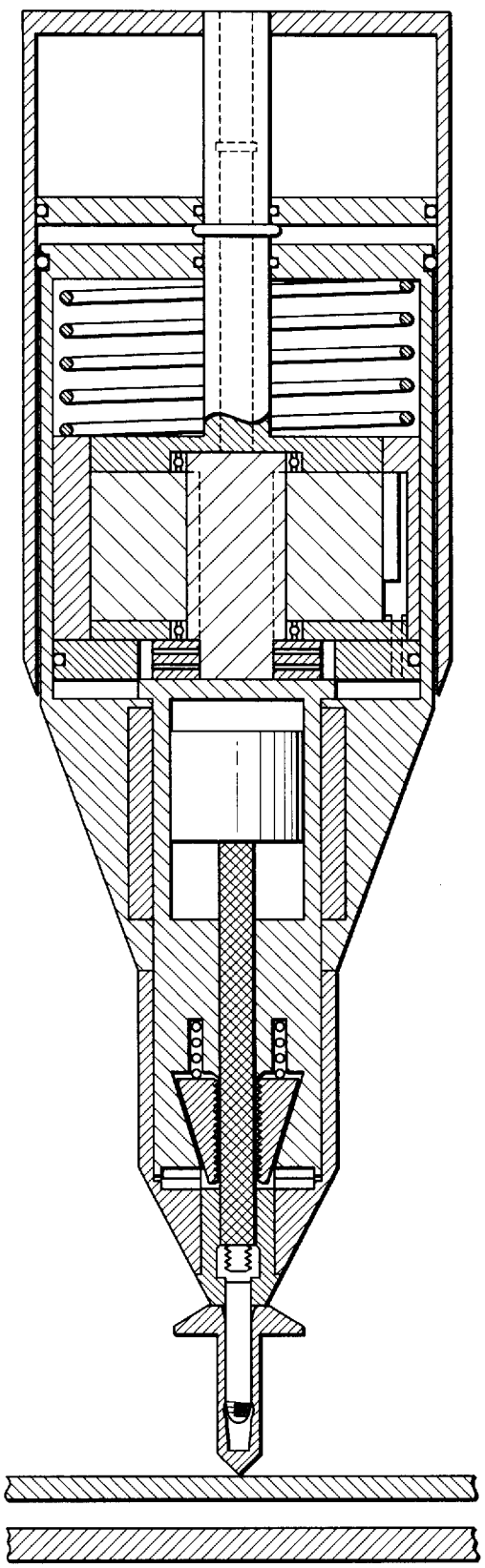
FIGS. 2A, 2B, 2C and 2D illustrate the device and blind rivet during various phases of blind riveting.
Figure 2B:
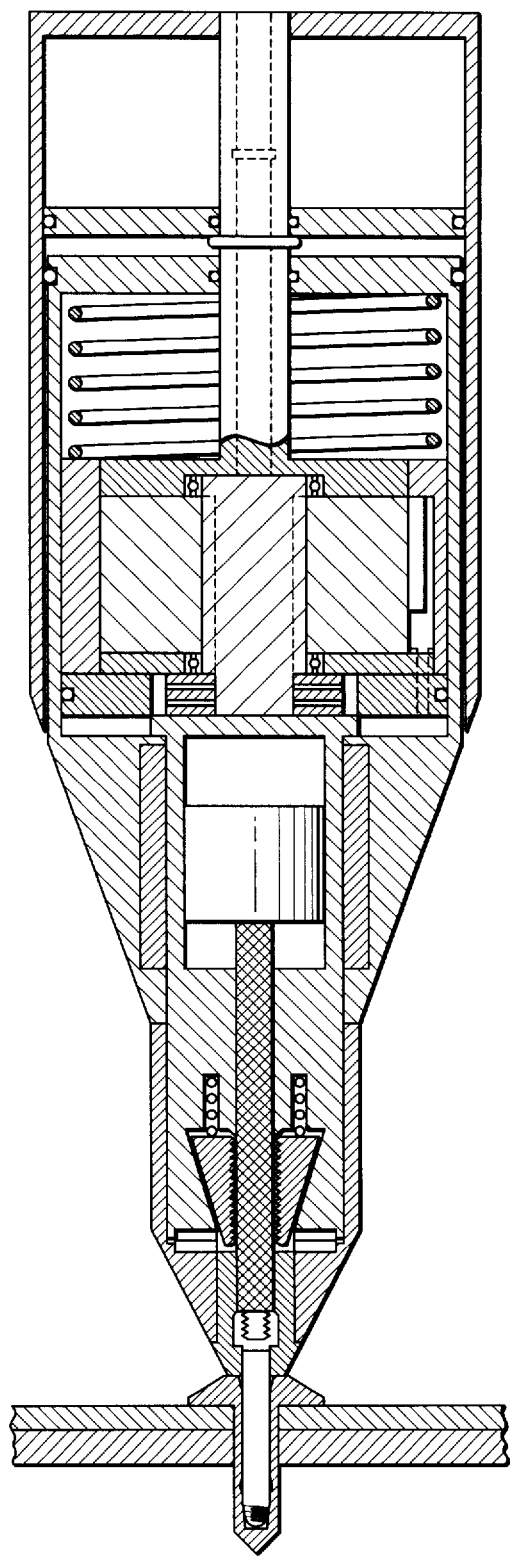
Figure 2C:
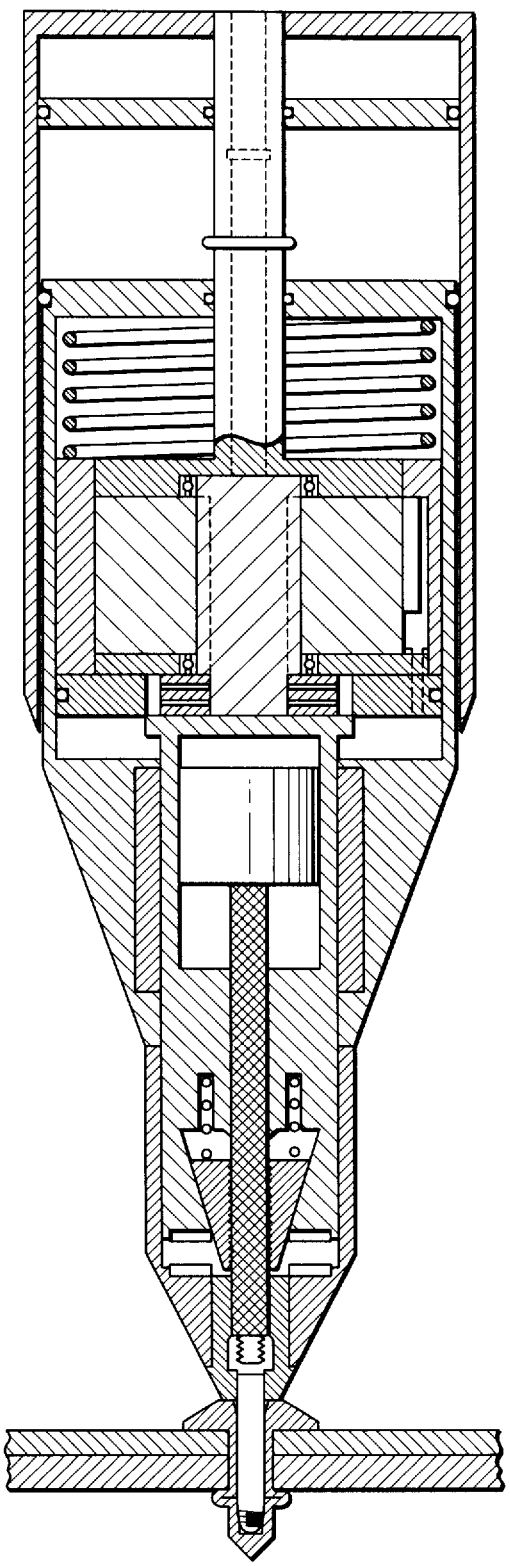

When the drilling is completed the drawing phase can begin after the motor has stopped. The pistons are activated by means of a port valve 14, and open the inlet 14a to the piston 2 and 14b up to the piston rod's cavity for activating the piston 2a where the inlet for activation is in the front edge of the locking ring 15, as well as the inlet 14c for activation 2b. During the drawing phase the expansion housing 5a will press against element 15 and thereby press the nose sleeve 5b forward. The gear rims 7a and 4b thus become disconnected while at the same time the grip jaws 4b engage with the drawing rod 4 due to the fact that the cone nut 11 and cone profile 11a are released from the grip jaw, thereby being activated by the spring 4c for locking in the planetary gearshaft 10c and thereby pull the rivet bottom towards the head 101. The central part of the rivet will be compressed in the conventional way in a controlled manner and the parts which are to be riveted together are clamped together between the rivet's expanding bottom section and the rivet head 101, as shown in FIG. 2C. The draw power and draw length can be adjusted according to rivet type/material by means of a unit/sensor in the tool for releasing the tool/rivet (not shown).

Figure 2D:
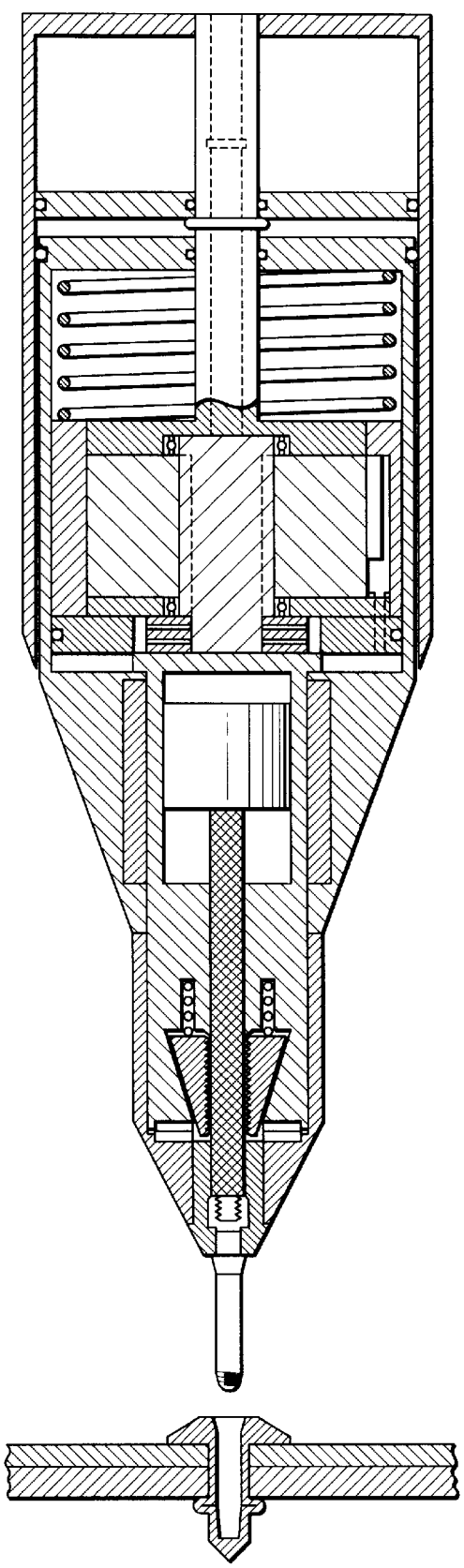

After the drawing phase is over the tool has to be released from the rivet. By letting the draw pistons go back the tool can be returned via the vane motor for activation which will automatically spin the drawing rod in right-hand rotation in order to go out of engagement with the rivet. (The process from FIG. 2C to FIG. 2D). This occurs due to the fact that the grip jaws 4b are still engaged with the drawing rod, and will return to the starting point with the gear rims engaged with each other, thereby releasing the grip jaws from the drawing rod and thus making them ready for the next operation. (FIG. 2D)

A further description of expansion within other areas of application will now be presented with reference to FIGS. 3A–C, 4A–B, 5A–C, 6A–E, 7, 8A–C and 9A–C.

The tool's replaceable nose heads increase the area of application within a number of fastening systems for riveting/expansion or a combination of these in the same nose head. The tool's procedure is the same as that described for a self-drilling blind rivet except for activated magnetic sensitivity, where the nose head's clamping sleeve and drawing rod take part in the rotation/drilling.

Figure 3A:
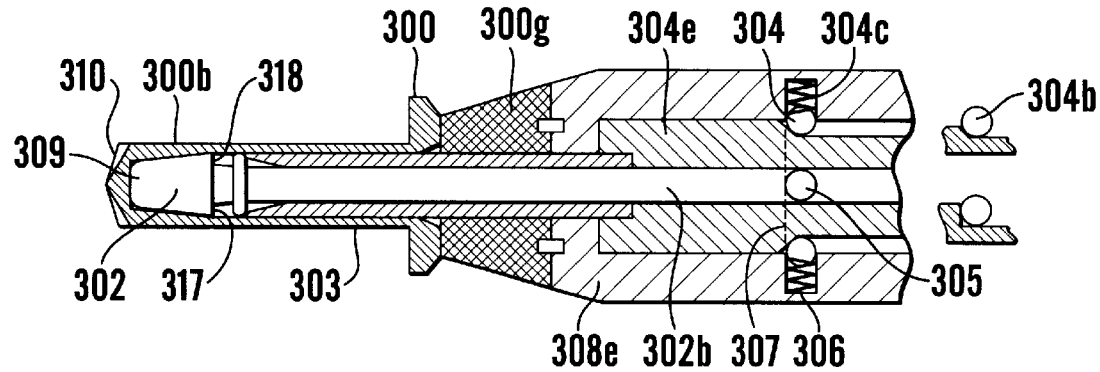
FIGS. 3A, 3B and 3C illustrate an alternative device according to the present invention.
Figure 3B:
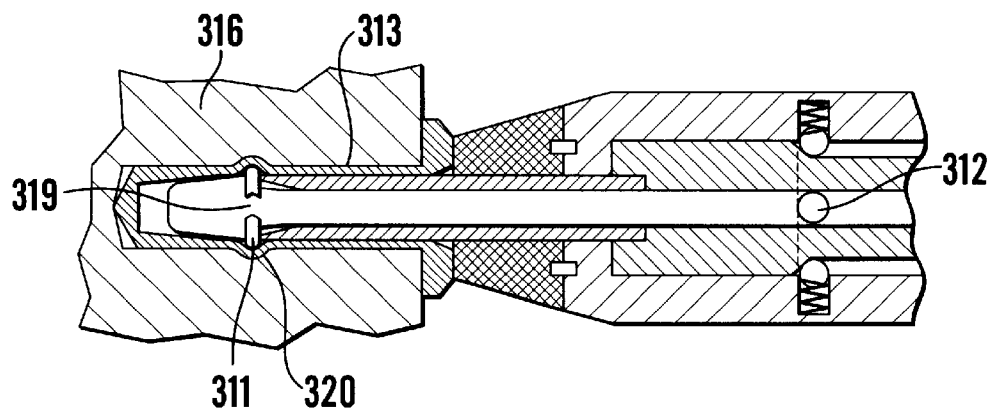
Figure 3C:
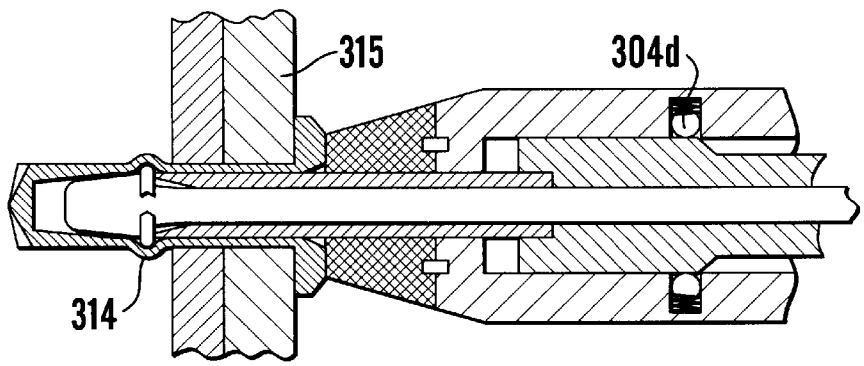

FIGS. 3A, 3B, 3C illustrate the nose head for a combination of self-drilling blind riveting and expansion.

FIG. 3A is shown with a mounted rivet 300. The nose head is located in the blind riveting position, the slide profile 304 being located in the non-locked position, but the ball 304b being located under the influence of a spring 304c. On the tool there is also mounted a clamping sleeve 303 which is located in the slide profile 304e.

During the activation procedure for mounting a rivet after drilling is completed, the drawing rod 302b, which in this case has been exchanged with a screw tap, will run freely through the nose head and expand against the rivet's wall 300b before the profile 304 overcomes the spring loading 304c. The drawing rod's profile 302 is pulled backwards, with the result that the expansion disc 311 dilates according to the profile up to the cam 318. The clamping sleeve 303 maintains this moment in the expansion phase, but will give way since the spring loading 304d, FIG. 3C, will slide on the attachment profile 304e and further swaging of the rivet for mounting will be as shown in FIG. 3C, i.e. adaptation of the rivet for mounting can be performed at any point along the walls of the rivet, since it is the length of the clamping sleeve 303 which is the determining factor (adjustable length).

By letting the tool return to the starting position, the drawing rod 302 will advance to the rivet's conical bottom 309, and in this case the profile will be used for release from the rivet's expanded wall. The centering/releasing expansion sleeve 311 will be released from contact with the rivet by returning to the starting position as illustrated in FIG. 3C to 3A, but in an expanded form.

FIG. 3B will only perform expansion of the rivet without the rivet's walls being swaged. The tool is adjusted in the process by rotating the nose head 308, FIG. 3A, 90°, when the ball will be located in a locked position at right angles 307 as illustrated 305. When the tool is activated the clamping sleeve 303 will be located in a locked position and only expansion will be performed as illustrated in FIG. 3B, without swaging of the rivet's walls. This process is performed in porous materials where the rivet is not intended to be used for conventional blind riveting, but for expansion as a fastening system, or as expansion in hard materials.

FIGS. 4A and 4B describe a self-drilling expansion sleeve 400f with a drill bit without a rivet head, but replaced with a hook profile 401b with engagement body 401e against the same on the tool's nose 401h. The process is controlled by the expansion system being deactivated inside the expansion sleeve for axial control. This process is identical to the procedure already described, but has internal threads 401a in a part of its internal section.

When the tool is activated, the drilling operation will be able to pass the expansion sleeve right into the element which has to be expanded (secured) without a head. When expansion takes place after drilling is completed, the drawing process will pull the drawing rod back (as previously described). The expansion disc 401k which is split 4011 will expand on the profile 401j while at the same time it is passed upwards on the wedge 401i. The design of this wedge has the same total degree of increase as the drawing rod's conical profile 401j up to the cam 401n. When expansion is completed, the tool will be released when the draw sleeve returns towards the expansion sleeve's profile 401p, and is released from the walls.

FIG. 4B has the same function, but performs anchoring 401d instead. In this case the expansion sleeve 401k will be designed with lugs (profile) for anchor expansion 401d. In this case the location in the longitudinal direction of the engagement body 401e and 401b will be in relation to the wedge 401i in order to ensure that the expansion disc's 401k lugs are located in the correct position for activation. The function of the expansion sleeves is for further threaded attachment of screws after mounting is completed.

Figure 5A:
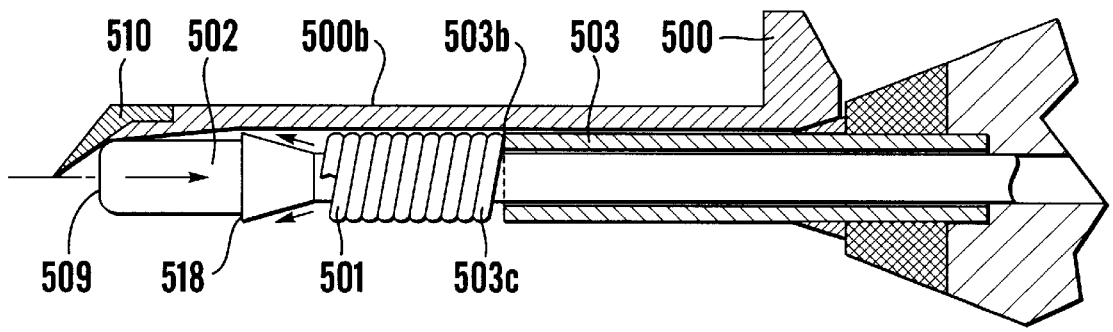
FIGS. 5A, 5B and 5C illustrate yet another embodiment in which an expansion disc is left in the rivet.
Figure 5B:
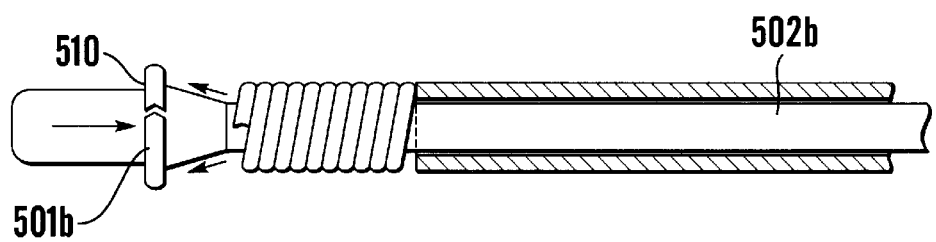
Figure 5C:
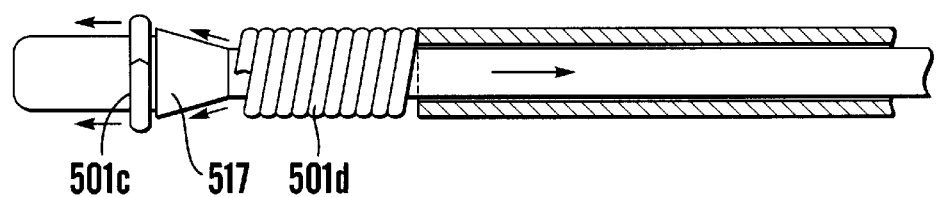

FIGS. 5A–C will be able to perform expansion due to the fact that the expansion disc is left in the rivet after mounting, and the magazine for storing these is in series on the drawing rod. After drilling is completed, the procedure will cause the drawing rod 502b to be pulled backwards in the tool, and the expansion disc 501 will be dilated by being pushed upwards along the drawing rod's cone 517. This pressure is against the edge 503b of the clamping sleeve 503 and the rest of the tension is expansion discs 501d which are located close together right up to the one which has to be mounted 501. The rest of the magazine's discs join in pushing the expansion disc which now has to be mounted all the way up until it is mounted and locked.

When the discs 501d are located as a magazine they are basically in axial tension. When the foremost disc 501 has achieved full expansion 501b, FIG. 5B, it will be released from axial tension and return to its natural shape 501c when it slides down from the profile 518 on the drawing rod. In this position disc no. 2 is not activated and will slide down the profile 517n when the tool is returned to the starting point. This occurs due to the fact that the discs' internal conical profile 510b, FIG. 5B, on discs no. 2,3,and 4 did not reach as far as the locked position, and will be left as a part of the magazine for new activation. This feeding is performed in steps in the tool up to the next expansion disc which has to be mounted (not shown).

The expansion sleeve's end piece 503b has the same profile as the last disc 503c. The final phase (ready-mounted expanded rivet, expansion sleeve) is as illustrated in FIGS. 6A–E, and the tool's nose head during this expansion is as shown in FIG. 3A using the locked ball 305. The expansion discs can also be without the locking profile 501c, and the profile 518 can also be removed, (FIG. 5C is illustrated with locking profile).

Figure 6A:
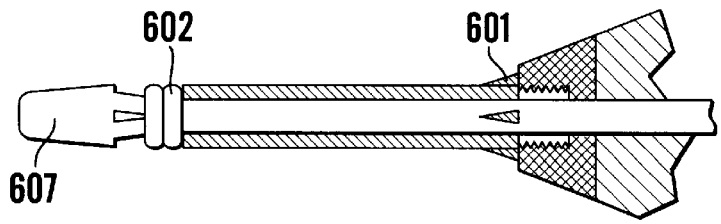
FIGS. 6A–6E illustrate another embodiment in which an expansion disc is left in the rivet.
Figure 6B:
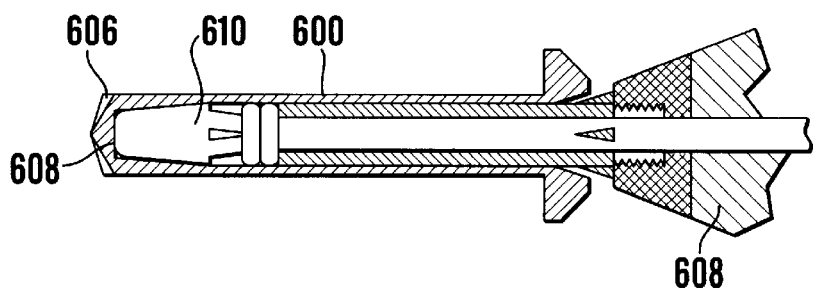
Figure 6C:
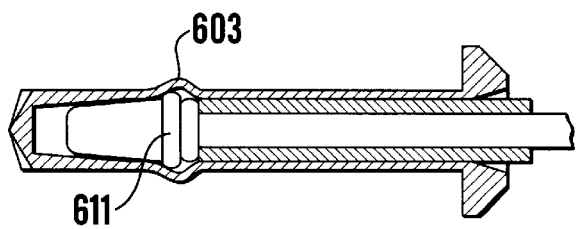
Figure 6D:
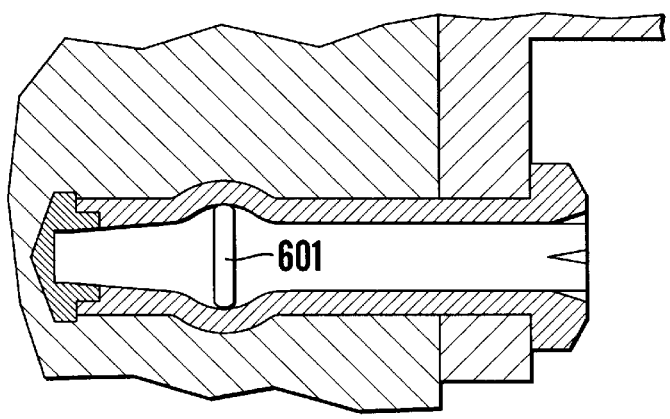
Figure 6E:
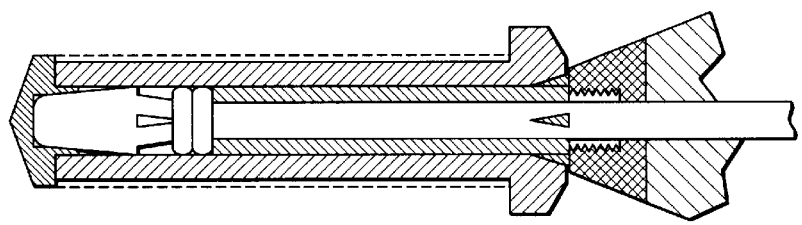

FIGS. 6A,B,C,D E follow the same procedure as the preceding section. During drilling for the self-drilling expansion system, the drawing rod 607 will always be in a locked position against the front area 608 of the rivet's core. This is in order to prevent the rivet's walls 600 from being damaged during swaging. This applies particularly when hammer drilling has to be performed by the tool in hard materials before the expansion process. By activating the tool's drawing rod 607 the expansion discs 602 will increase their diameter by expanding on the drawing rod's conical part 610, while at the same time they lie split against the wedge 611, FIG. 6C. By letting the tool go back, the expansion discs will return to the starting position, while at the same time the drawing rod will be centered in the rivet's front conical core 608. This is to ensure that the expansion discs will be clear of the rivet wall 600, due, e.g., to burrs which can arise in the expansion process, FIG. 6B. Thereafter release is as illustrated in FIG. 6D, (without expansion disc 601). FIG. 6E illustrates an embodiment of a self-drilling expansion bolt with higher strength.

Figure 7:
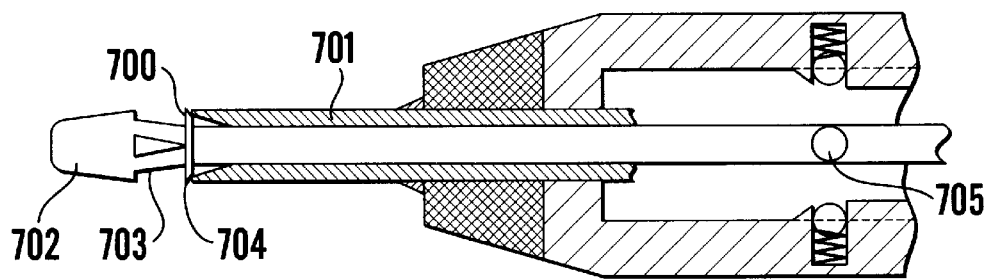
FIG. 7 illustrates a device with a cutting disc.

In FIG. 7, a disc 704 with a cutting edge 700 has been mounted on the tool head. This procedure is performed as already described with a locked ball 705 in order to lock the clamping sleeve 701. By pushing this into rivets/expansion rivets which have to be dismantled, this process will cut the walls in the rivet in order to release the mounted rivet. Cutting is performed by activation/rotation of the tool during the procedure. The principle is the same as in a pipe cutter system, but from the inside out towards the wall of the rivet for dismantling the fastening system.

Figure 8A:
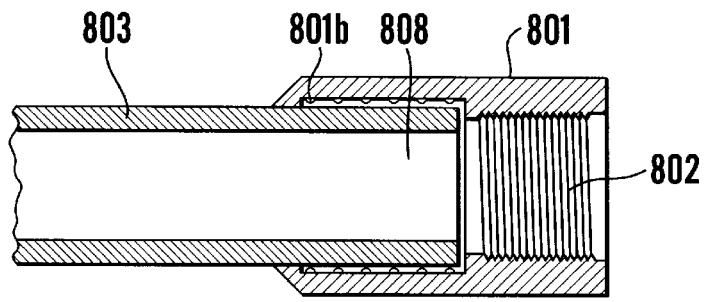
FIGS. 8A, 8B and 8C illustrate the present invention used with a hose/pipeline system.
Figure 8B:
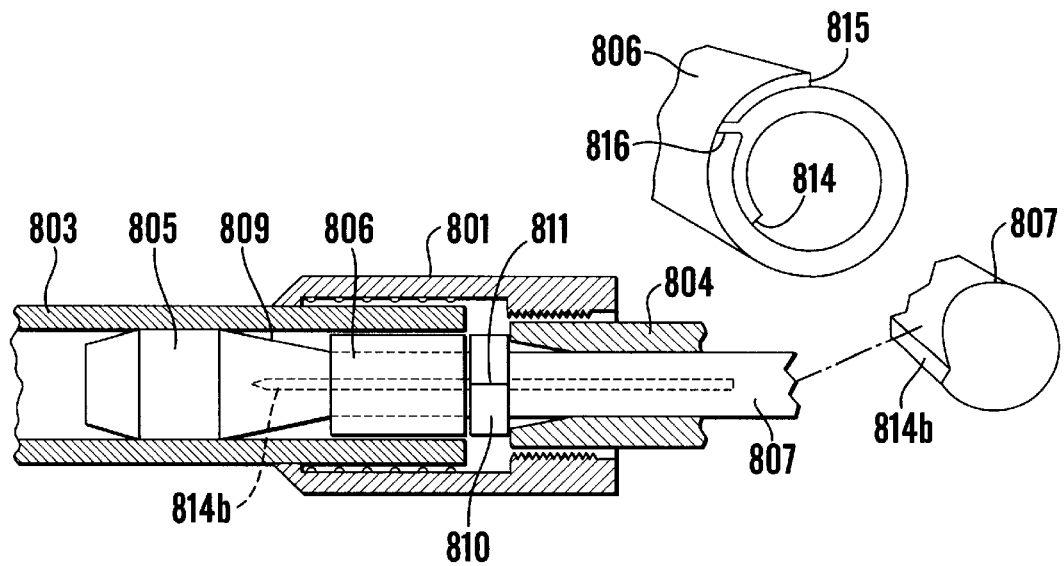
Figure 8C:
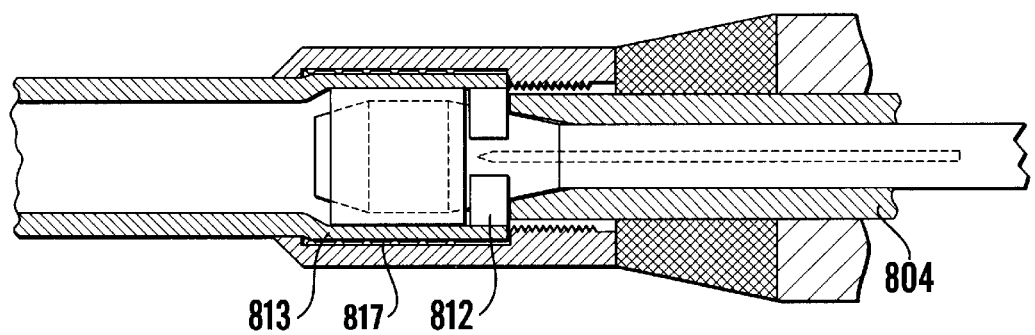

FIGS. 8A–B illustrate a hose/pipeline system which forms a part of the same program as riveting/expansion. The element here is a pipe socket which has to be joined.

FIG. 8A illustrates a socket 801 with threads 802 which are pushed on a hose 803.

FIG. 8B illustrates a process on the same principle as expansion riveting from a tool with a locked clamping sleeve 804, which in this case is a hose clip expanded from within up to a locked position with continued full flow of liquid after mounting has been completed.

By pushing the nose head's function into the socket which is threaded on the outside of a hose 803 for subsequent permanent mounting, the process will proceed as follows:

The expansion sleeve 806 is threaded on to the drawing rod 807, which is then threaded into the socket. In this position, FIG. 8B, the expansion sleeve 806 is in the correct position in the socket's expansion housing. By pulling alone the drawing rod 805 will be pulled back by the tool and the expansion sleeve 806 will expand against the hose's 803 internal wall and out towards the expansion housing's sealing collar 801b, when it is expanded by the cone 809 of the drawing rod. The expansion disc 810 which is split 811 assists the expansion sleeve with full expansion until it is expanded in a locked position as in FIG. 8C. This is due to the fact that the expansion disc 810 is in conical tension and does not have as large a diameter as the expansion disc when it is mounted. The clamping sleeve 804 maintains its position during the process. The clamping sleeve which has a conical front section by means of which the drawing rod's 809 can be threaded on to the drawing rod 807. The drawing rod's profile 814b has a profile similar to that of the clamping sleeve 814.

In FIG. 8B, when the clamping sleeve is locked, element 816 will be engaged with element 815, and element 814 will engage with element 816. As illustrated, these engagements have a somewhat tilted profile axially for locked fastening or mounting. After full expansion has been completed, the tool is withdrawn for the next mounting. In this case the principle will also be very useful with regard to fastening devices on a large scale.

Figure 9A:
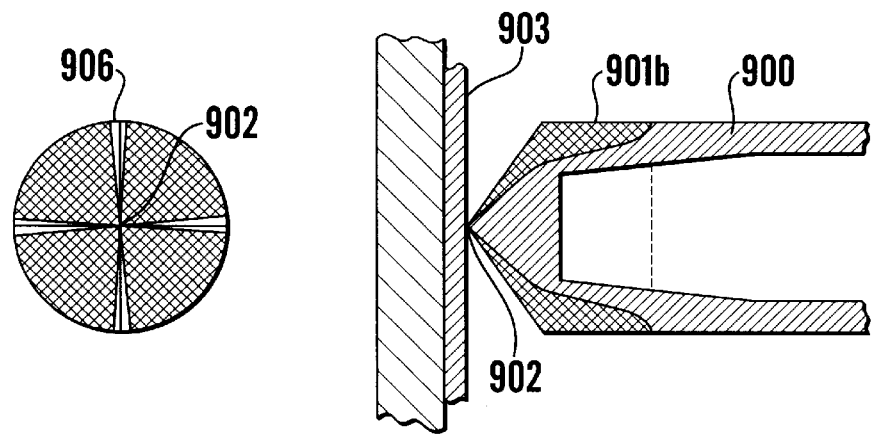
FIGS. 9A, 9B and 9C illustrate a hardened tip of the rivet.
Figure 9B:
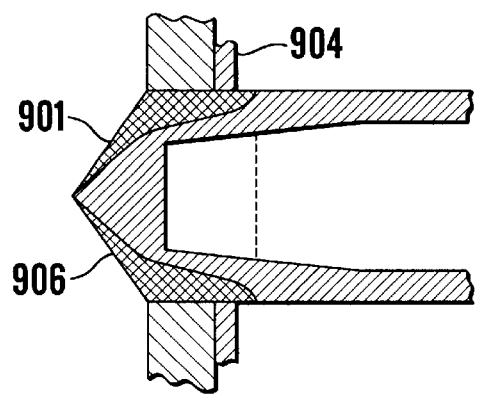
Figure 9C:
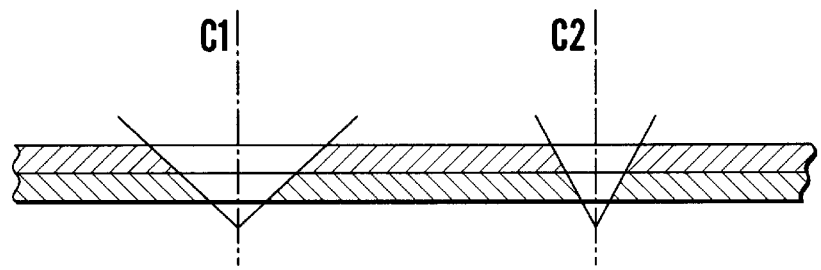

FIGS. 9A,9B,9C illustrate an integral drill tip with quartz.

A rivet wall 900, FIG. 9A, with a drill tip 906, FIG. 9B, which is ground as a drill tip in a suitable material is illustrated. (This is especially suitable for self-drilling blind/expansion rivets in softer materials, e.g. aluminum.) The area between the cutting edges consists of quartz 901, FIG. 9B, and forms a conical drill tip. Viewed from the front, FIG. 9B (on the left) it can consist of 2 or 4 cutting edges 906 and the rest of the area is filled with quartz. During the drilling process the drill bits 902 will center the drilling operation, and the quartz material will attend to further drilling/grinding, since in this case the material strength of the rivet's drill bit 906 is soft, and will therefore give way. Thus the quartz will perform the drilling/grinding of the hole in the element 903. In other words the rivet's drill bit is only involved as a helper in the process of position control through the element 904. The material attaching the quartz to the rivet cone is the same as that used in the field of grinding. It is an advantage here to use coarse quartz grains in order to obtain a maximum contact surface (picking up shavings from the drilling operation). It should be noted that this only applies to thinner materials (thin plates). The amount of shavings picked up also depends on the extent of the angle of the drill tip, FIG. 9C. C1 will have a larger contact surface than C2, but will be limiting for the absorption of drilled material for thicker materials. The more acute the angle, the less the contact surface, but the better it will cope with thicker materials. The drill tip should have an optimum degree of angle and contact surface in relation to material thickness.

I claim:

1. A method for blind riveting comprising:
providing a blind rivet having a self-drilling tip at one end thereof and an axial hole therein, said axial hole having one end adjacent the self-drilling tip and an opposite end extending through an end of the blind rivet, the hole adjacent said one end being defined by a wall which is substantially smooth;
providing a mounting device, and simultaneously forming threads in a portion of the axial hole and drilling said blind rivet into a material by utilizing said mounting device;
further utilizing said mounting device to expand said blind rivet once the rivet is drilled into the material.

2. The method according to claim 1, further including the step of utilizing said mounting device to control the position of the expansion of the rivet.

3. The method according to claim 2, wherein the rivet includes a rivet head, and further comprising the step of expanding the rivet such that the area between the expanded section and the rivet head is not swaged or deformed when the rivet is expanded.

4. The method according to claim 1, wherein the blind rivet includes a head with an engagement body adapted for co-operation with a complementary shaped screw nose on the mounting device, wherein the step of utilizing a mounting device to drill said blind rivet into a material comprises engaging the screw nose with the engagement body in order to drill the rivet into the material.

5. The method according to claim 1, wherein a portion of said smooth wall is conical, wherein the step of forming the threads comprises forming the threads in the conical, smooth wall portion.

6. The method according to claim 1, wherein the step of providing the mounting device comprises providing the mounting device having a housing with a drawing system comprised of three pistons and a tool in the form of a drawing rod which extends along the entire length of the mounting device, a draw pin removably attached to a front end of the drawing rod, and a rear end of the draw pin being connected with a selectively activated body for locking or releasing the draw pin.

7. The method according to claim 6, wherein the selectively activated body is magnetically activated or moment activated.

8. The method according to claim 6, further comprising providing the draw pin with a backing and a screw nose which is complementary to an engagement body formed on a head of the rivet, and connecting the draw pin to a motor within the housing, and forming the draw pin to have a section in the form of a screw tap which forms the threads in the smooth wall portion.

9. The method according to claim 8, wherein the step of expanding the rivet comprises using the drawing rod to pull the rivet due to the engagement between the screw tap and the threads formed thereby, the screw nose forming a backing against the rivet head when the rod pulls the rivet.

10. The method according to claim 8, wherein the screw tap has a left-hand thread.

11. The method according to claim 8, wherein the motor and the pistons are operated either electrically, pneumatically, or hydraulically.

12. The method according to claim 6, further comprising adjusting the movements of the drawing rod in order to vary the draw force and the draw length.

13. The method according to claim 1, further comprising positioning an expansion disc in the hole using the mounting device, and thereafter causing expansion of the expansion disc in order to expand the rivet.

14. The method according to claim 13, wherein after the step of expanding the rivet using the expansion disc, the expansion disc remains permanently mounted within the rivet and assumes its original annular shape.

15. The method according to claim 13, wherein the step of providing a mounting device comprises providing the mounting device having a housing with a drawing system including a drawing rod which extends along the entire length of the mounting device, further comprising providing the mounting device with a clamping sleeve in order to counteract swaging of the rivet in the section between the clamping sleeve and a head of the rivet when the rivet is pulled.

16. The method according to claim 15, further comprising providing the mounting device with a profile element arranged to be locked in a conical portion of the axial hole, said profile element rotating during drilling of the rivet in order to prevent swaging of the rivet wall before the wall is expanded.

17. The method according to claim 1, wherein the self-drilling tip is manufactured as an integral hardening zone on the rivet.

18. The method according to claim 1, wherein the self-drilling tip is manufactured with a coating chosen from the group consisting of oxides, carbides, quartz, and hard metals.

* * * * *